United States Patent [19]

Tokarz

[11] Patent Number: 5,772,275
[45] Date of Patent: Jun. 30, 1998

[54] APPARATUS AND METHOD FOR SECURING A CONVERTIBLE ROOF TO AN AUTOMOBILE VEHICLE

[75] Inventor: Stephen P. Tokarz, Flat Rock, Mich.

[73] Assignee: ASC Incorporated, Southgate, Mich.

[21] Appl. No.: 714,007

[22] Filed: Sep. 13, 1996

Related U.S. Application Data

[63] Continuation of Ser. No. 220,294, Mar. 30, 1994, Pat. No. 5,624,149, which is a continuation-in-part of Ser. No. 940,570, Sep. 4, 1992, Pat. No. 5,301,987.

[51] Int. Cl.$^6$ ...................................................... B60J 7/185
[52] U.S. Cl. ...................... 296/121; 296/108; 292/DIG. 5
[58] Field of Search ................................... 296/107, 108, 296/116, 117, 121; 292/DIG. 5

[56] References Cited

U.S. PATENT DOCUMENTS

| | | |
|---|---|---|
| Re. 24,375 | 4/1957 | Thompson, III . |
| 1,056,333 | 3/1913 | Hill . |
| 1,174,366 | 3/1916 | Van Denn Plas . |
| 1,269,311 | 6/1918 | Rixon . |
| 1,831,494 | 11/1931 | Hynes et al. . |
| 1,856,531 | 5/1932 | Berg . |
| 1,892,512 | 12/1932 | Kemp . |
| 1,905,814 | 4/1933 | Orlow . |
| 1,929,371 | 10/1933 | Hamilton . |
| 2,201,330 | 5/1940 | Wernig et al. . |
| 2,360,524 | 10/1944 | Simpson . |
| 2,468,251 | 4/1949 | Wiederman . |
| 2,486,905 | 11/1949 | Ackermans . |
| 2,560,459 | 7/1951 | Lundbert et al. . |
| 2,570,260 | 10/1951 | Milhan . |
| 2,570,261 | 10/1951 | Milhan . |
| 2,586,648 | 2/1952 | Hale et al. . |
| 2,674,480 | 4/1954 | Vigmostad . |
| 2,709,621 | 5/1955 | Votypka et al. . |
| 2,753,202 | 7/1956 | Smith et al. . |
| 2,785,914 | 3/1957 | Thomas et al. . |
| 2,831,718 | 4/1958 | Hallek et al. . |
| 2,852,292 | 9/1958 | Galla . |
| 2,879,988 | 3/1959 | Klisch . |
| 2,916,327 | 12/1959 | Gilson . |
| 2,926,943 | 3/1960 | Leslie et al. . |
| 3,089,719 | 5/1963 | Csizmansky . |
| 3,135,541 | 6/1964 | Kwasek . |
| 3,151,375 | 10/1964 | Schevenell . |
| 3,314,703 | 4/1967 | Fitzpatrick . |
| 3,353,864 | 11/1967 | Antaya et al. . |
| 3,362,740 | 1/1968 | Burns . |
| 3,400,562 | 9/1968 | Bloss . |
| 3,425,742 | 2/1969 | Rauber, Jr. . |
| 3,443,834 | 5/1969 | Andres . |
| 3,586,360 | 6/1971 | Perrotta . |
| 3,712,665 | 1/1973 | Klein . |
| 3,751,949 | 8/1973 | Castle . |
| 3,845,976 | 11/1974 | Peterson . |
| 3,891,252 | 6/1975 | Lehmann . |
| 4,470,277 | 9/1984 | Uyeda . |
| 4,537,440 | 8/1985 | Brockway et al. . |
| 4,618,180 | 10/1986 | Muscat . |
| 4,664,436 | 5/1987 | Eyb . |

(List continued on next page.)

FOREIGN PATENT DOCUMENTS

| | | |
|---|---|---|
| 0 188 774 | 12/1985 | European Pat. Off. . |
| 0 492 006 | 12/1990 | European Pat. Off. . |
| 805229 | 5/1951 | Germany . |
| 1505721 | 7/1970 | Germany . |
| 352786 | 7/1931 | United Kingdom . |
| 536578 | 5/1941 | United Kingdom . |
| WO 96/27509 | 9/1996 | WIPO . |

OTHER PUBLICATIONS

"Saab Owners Workshop Manual" by Haynes Publications, Inc., 1981, 1986, pp. 238–239.

*Primary Examiner*—Dean Kramer
*Attorney, Agent, or Firm*—Harness, Dickey & Pierce, P.L.C.

[57] ABSTRACT

A latching mechanism and method secures a convertible roof to a body of an automotive vehicle acting proximate with the front of the roof, rear of the roof, or both. In one aspect of the present invention, a catch secures the rearmost portion of a convertible roof to a tonneau cover.

22 Claims, 8 Drawing Sheets

U.S. PATENT DOCUMENTS

| | | |
|---|---|---|
| 4,702,505 | 10/1987 | Alexander . |
| 4,720,133 | 1/1988 | Alexander et al. . |
| 4,746,163 | 5/1988 | Muscat . |
| 4,801,173 | 1/1989 | Trenkler . |
| 4,817,999 | 4/1989 | Drew . |
| 4,830,425 | 5/1989 | Muscat . |
| 4,830,426 | 5/1989 | Schlachter et al. . |
| 5,042,869 | 8/1991 | Brin . |
| 5,046,767 | 9/1991 | Muscat . |
| 5,058,939 | 10/1991 | Miilu . |
| 5,064,241 | 11/1991 | Ohrle . |
| 5,067,768 | 11/1991 | Fischbach . |
| 5,085,483 | 2/1992 | Alexander . |
| 5,154,479 | 10/1992 | Sautter, Jr. . |
| 5,186,516 | 2/1993 | Alexander . |
| 5,219,199 | 6/1993 | Smith et al. . |
| 5,267,769 | 12/1993 | Bonne et al. . |
| 5,269,586 | 12/1993 | Hahn et al. . |
| 5,301,987 | 4/1994 | Tokarz et al. . |
| 5,328,229 | 7/1994 | Brandt et al. . |
| 5,489,146 | 2/1996 | Fischbach . |

APPARATUS AND METHOD FOR SECURING A CONVERTIBLE ROOF TO AN AUTOMOBILE VEHICLE

This is a continuation of U.S. patent application Ser. No. 08/220,294, filed Mar. 30, 1994, now U.S. Pat. No. 5,624,149 which is a CIP of U.S. patent application Ser. No. 07/940,570 filed Sep. 4, 1992, now U.S. Pat. No. 5,301,987.

BACKGROUND AND SUMMARY OF THE INVENTION

This invention relates generally to convertible vehicles and specifically to an apparatus and method for securing a convertible roof to an automotive vehicle.

In the automotive field, various types of latches are provided to secure movable panels to a body of an automotive vehicle. For example, latches have been used to secure passenger doors, a fuel filler door, a hood and a trunk lid. Traditionally, many of these latches employ a striker pin and a rotating catch mechanism biased by a spring to secure the striker pin within the catch. More recently, however, these older purely mechanical latch mechanisms have been replaced by electromechanical latching mechanisms. These latch catches are actuated by an electric motor and often include a pull down function as well.

Various systems have also been constructed which serve to retain a rearmost roof bow of a convertible roof to a tonneau cover when the roof is in its raised functional position. For example, a motor driven rotatable nut mounted beneath a tonneau cover used to engage a threaded stud extending from a rearmost roof bow is disclosed in U.S. Pat. No. 5,067,768 entitled "Power Convertible Top with Automatic Top and Tonneau Sequencing" which issued to Fischbach on Nov. 26, 1991.

Additionally, many conventional latching mechanisms have been employed to attach the frontmost roof bow of a convertible top to a front header which surrounds the upper portion of a windshield. Such devices are disclosed in the following U.S. patents: U.S. Pat. No. 5,058,939 entitled "Power Latch System" which issued to Miilu on Oct. 22, 1991; 5,042,869 entitled "Locking Arrangement for a Motor Vehicle Top" which issued to Brin on Aug. 27, 1991; 4,817,999 entitled "Convertible Header Latch Mechanism" which issued to Drew on Apr. 4, 1989; U.S. Pat. No. 4,537,440 entitled "Vehicle with a Convertible Top" which issued to Brockway et al. on Aug. 27, 1985; U.S. Pat. No. 2,852,292 entitled "Convertible Top Power Header Lock" which issued to Galla on Sep. 16, 1958; and, U.S. Pat. No. 2,560,459 entitled "Locking Mechanism for Convertible Tops" which issued to Lundberg et al. on Jul. 10, 1951. However, all of these references show the latching mechanisms mounted within the retractable roof. This added weight hanging on the retractable roof creates additional stresses to the roof members thereby necessitating more rigid, heavier and expensive linkage members and actuators. Other securing constructions having a latching mechanism incorporated within a front header are disclosed in the following U.S. patents: U.S. Pat. No. 5,186,516 entitled "Power Latch System" which issued to Alexander et al. on Feb. 16, 1993; U.S. Pat. 5,085,483 entitled "Convertible Top Latching Mechanism" which issued to Alexander on Feb. 4, 1992; U.S. Pat. No. 5,064,241 entitled "Closing Device for Convertible Vehicles" which issued to Öhrle on Nov. 12, 1991; U.S. Pat. No. 4,702,505 entitled "Convertible Top Latch Mechanism" which also issued to Alexander on Oct. 27, 1987; U.S. Pat. No. 3,425,742 entitled "Locking Means for Locking the Top of a Convertible Automobile" which issued to Rauber on Feb. 4, 1969; and, U.S. Pat. No. 2,586,648 entitled "Locking Mechanism for Folding Tops" which issued to Hale et al. on Feb. 19, 1952; all of which are incorporated by reference herewithin. Although, many of these conventional devices function satisfactory, there still remains room for further simplification, cost reduction and common usage of parts.

In accordance with the preferred embodiment of the present invention, a new and useful apparatus and method for securing a convertible roof to a body of an automotive vehicle acts proximate with the front of the roof, rear of the roof, or both. In one aspect of the present invention, a catch secures a rearmost portion of a convertible roof to a tonneau cover. In a further aspect of the present invention, a catch mechanism is substantially located and hidden within a front header thereby eliminating undesirable head impact obstructions or unsightliness. In another aspect of the present invention, a first catch mechanism secures a rear portion of a convertible roof to a tonneau cover and a substantially similar second catch mechanism secures a forward portion of the roof to a front header. A further aspect of the present invention employs a movable striker for engagement with a catch. In yet another aspect of the present invention, a latching apparatus is employed in combination with a retractable hard-top roof. Additional features and advantages of the present invention will become more apparent by referring to the following description in conjunction with the accompanying drawings.

DETAILED DESCRIPTION OF THE PREFERRED EMBODIMENT

Figures 1, 5:
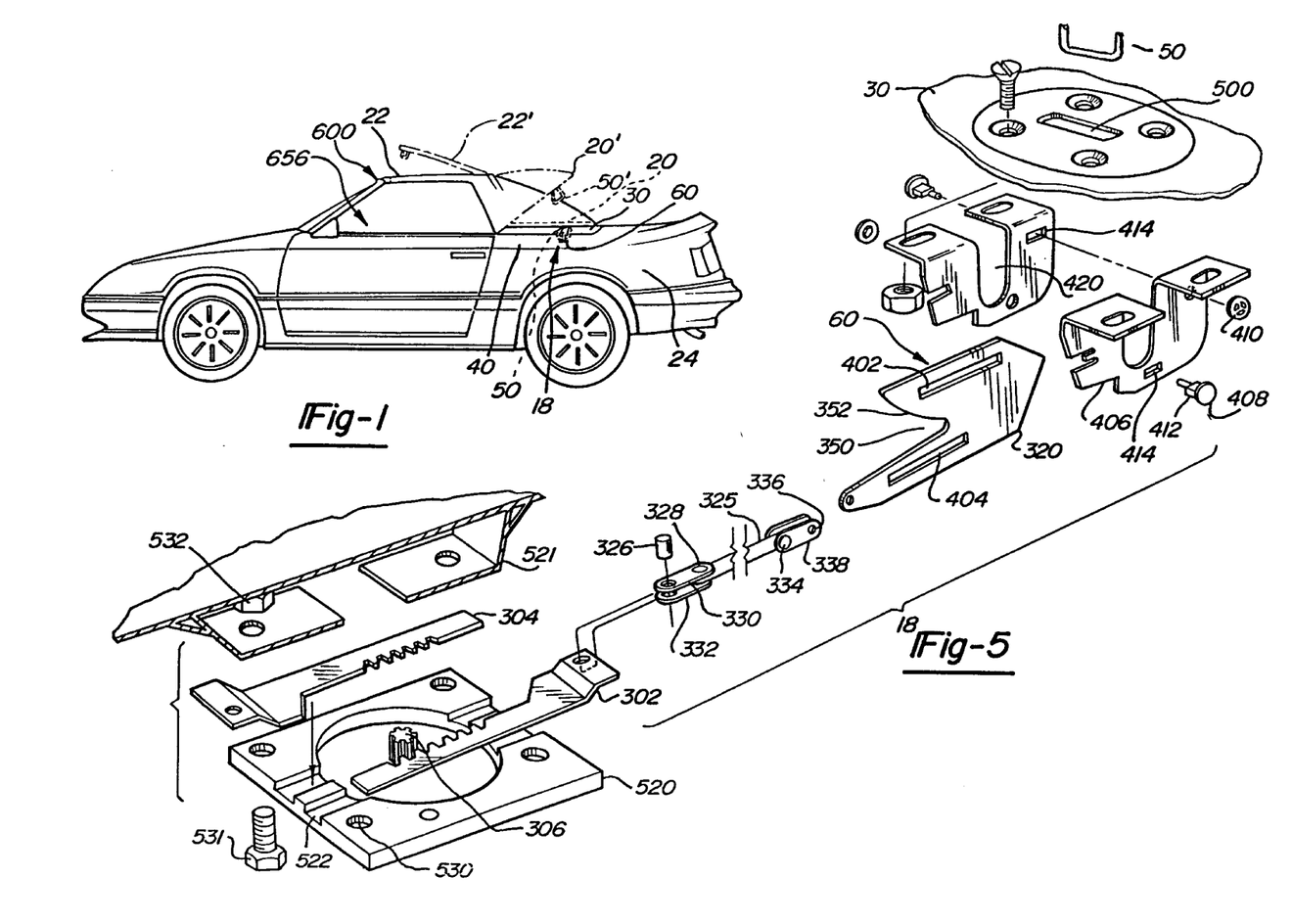
FIG. 1 is a side elevational view of a preferred embodiment of a front and rear latching apparatus of the present invention securing a soft-top convertible roof to a body of an automotive vehicle.
FIG. 5 is an exploded perspective view showing the preferred embodiment of the rear latching apparatus of the present invention of FIG. 2.

As shown in FIG. 1, a preferred embodiment of a rear latching apparatus 18 of the present invention acts to secure a rearmost or number five roof bow 20 of a fabric covered convertible roof 22 to a body 24 of an automotive vehicle including a tonneau cover 30 and a rear quarter panel 40. More particularly, number five bow 20 has a pair of latch loops or strikers 50 which are engaged by a pair of catch mechanisms 60 to secure number five bow 20.

As can be seen better in FIGS. 2 through 5, each striker 50 is made from quarter inch steel rod which is formed into a generally D-shape and spot welded to the underframing 104 (FIG. 3) of number five bow 20. It can be appreciated by one of ordinary skill in the art that the manner in which the striker 50 is affixed to the vehicle panel can be adapted to best suit the needs of the particular situation. For example, striker 50 could be riveted, adhered or bolted. If bolted, the striker's position can be adjusted by slipping the striker's orientation with respect to the bolts. In this preferred embodiment, striker 50 is aligned with respect to the longitudinal center line of the vehicle whereby each catch mechanism 60 is aligned perpendicular to the corresponding striker 50. This particular alignment allows for a single drive mechanism or actuator 200 to operate both catch mechanisms 60 at either outermost corner of number five bow 20, as will be described in more detail hereinafter.

Figure 2:
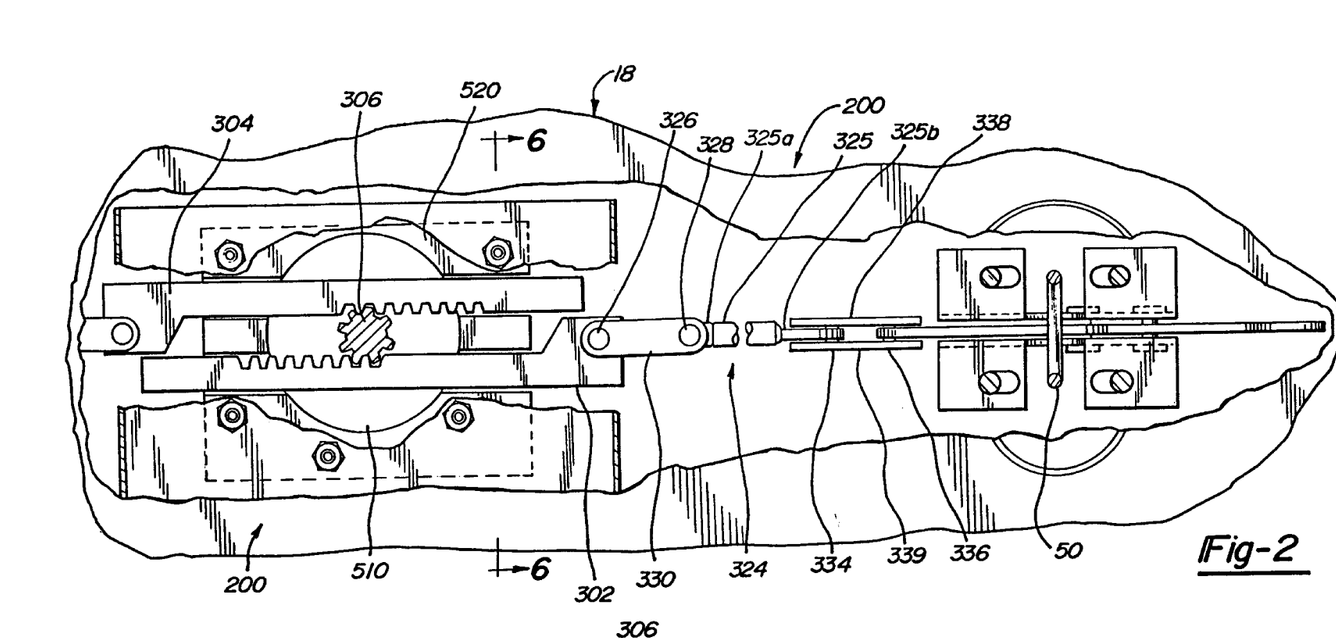
FIG. 2 is a fragmentary top elevational view showing the preferred embodiment of the rear latching apparatus of the present invention of FIG. 1.
Figure 3:
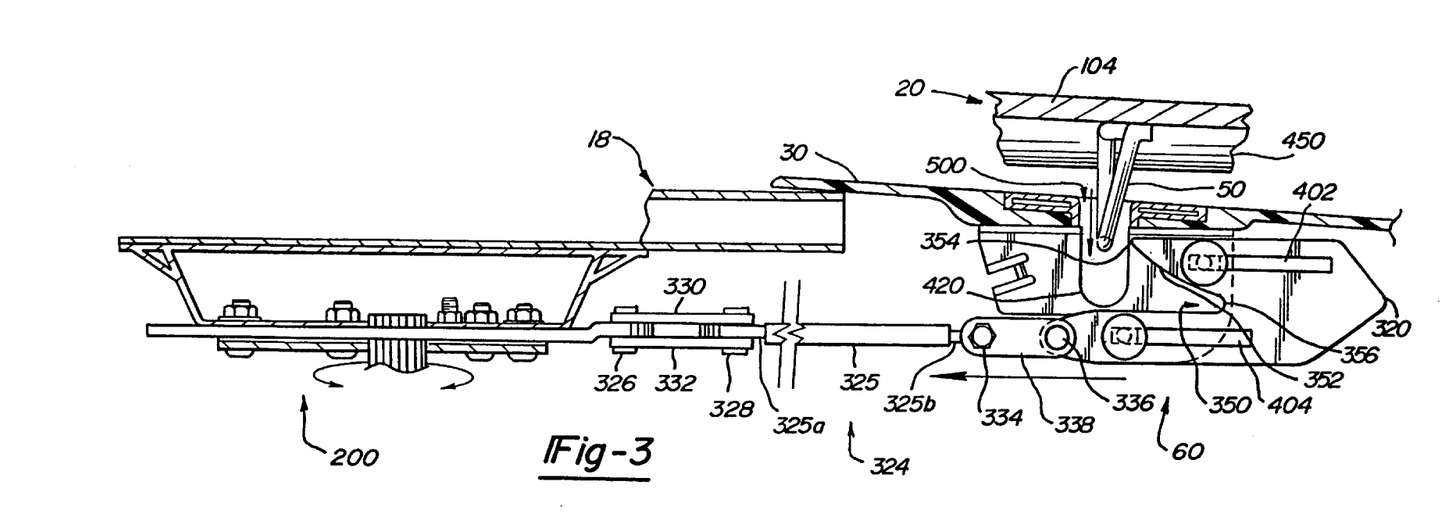
FIG. 3 is a fragmentary front elevational view, partially in section, showing the preferred embodiment of the rear latching apparatus of the present invention of FIG. 2, illustrated in a disengaged position.
Figure 4:
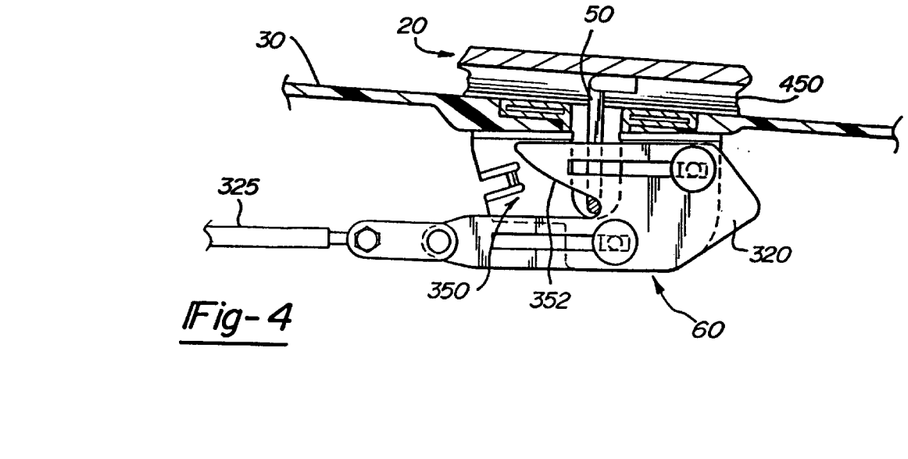
FIG. 4 is a view similar to FIG. 3 showing the preferred embodiment of the rear latching apparatus of the present invention of FIG. 3, illustrated in an engaged position.

Drive mechanism 200 includes a rack and pinion assembly having two opposing racks 302 and 304 driven by a single pinion gear 306. Rack 302 translates transversely thereby causing a pair of catches 320 to engage and disengage strikers 50. This particular configuration allows both catch mechanisms 60 to be actuated by a single drive mechanism 200. Because of this symmetry of operation, only the left side (as viewed from the rear of the vehicle) catch mechanism 60 has been shown. However, it can be appreciated that the configuration of the right side is substantially similar.

Rear latching apparatus 18 operates as follows. Catch 320 engages striker 50 to secure number five bow 20. More particularly, as pinion gear 306 rotates, rack 302 translates laterally. Attached to rack 302 is a connecting element or rod assembly 324 which attaches to catch 320. In this embodiment, rod assembly 324 includes a ⅛" steel rod 325 flattened on either end 325a and 325b which are attached on one end to the rack 302 by way of rivets 326 and 328 and links 330 and 332. Rod 325 is attached on the other end to catch 320 by way of rivets 334 and 336 and links 338 and 339. It can be appreciated that ordinary skill can be used to modify the manner in which rack 302 and catch 320 are mechanically linked. Similarly, loading conditions encountered in a particular vehicle application may dictate that connecting rod 325 be fashioned of heavier material. As viewed from the top, as shown in FIG. 2, clockwise rotation of pinion gear 306 translates rack 302 and catch 320 from a striker disengaged position (FIG. 3) to a striker engaged position (FIG. 4) toward the vehicle centerline. Conversely, counter clockwise rotation of pinion gear 306 translates rack 302 and catch 320 from the striker engaged position to the striker disengaged position. Here, because a rigid connecting rod assembly 324 is used, rack 302 "pulls" or tensions catch 320 to engage striker 50, and "pushes" or compresses to disengage catch 320 from striker 50. Likewise, the opposite side catch is "pulled" by rack 304 to engage the corresponding striker and is "pushed" to disengage. Thus, the single drive mechanism 200 accomplishes both the latching and unlatching function for both rear catch mechanisms 60.

Referring to FIG. 5, catch mechanism 60 includes the catch 320, which is formed from ¼" steel in a hook-like J-shape. A latch notch 350 has a sloped edge 352 thereby defining the short leg of the "J-shape". Catch 320, of course, may need to be fashioned from heavier material or may have varying shapes depending upon, the specific loading conditions. Upper and lower slotted guide tracks 402 and 404 are formed along the lateral edges of catch 320. A catch bracket 406, which is bolted to the underside of tonneau cover 30, has guide pins 408 that engage guide tracks 402 and 404 of catch 320. This secures catch 320 vertically with respect to bracket 406 while still allowing it to slide laterally within bracket 406. Guide pins 408 are secured within catch bracket 406 using rivet caps 410. Guide pins 408 have a flattened pin portion 412 which both engage guide pin slots 414 of catch bracket 406 as well as guide tracks 402 and 404 of catch 320.

Catch bracket 406 has a generally U-shaped channel 420 designed to allow striker 50 to clear catch bracket 406. This relationship can be better appreciated by referring to FIGS. 3 and 4. As number five bow 20 is lowered into position, striker 50 enters an access hole 500 in tonneau cover 30. Once through access hole 500, striker 50 enters the void in channel 420 of catch bracket 406. Thus, channel 420 provides sufficient clearance for striker 50 to reach the proper position for being engaged by catch 320. As catch 320 is moved from the disengaged (FIG. 3) to the engaged (FIG. 4) position, striker 50 travels along sloped edge 352 from a narrow end 354 toward a base 356 of notch 350 in a line of travel substantially perpendicular to that of the movement of catch 320. The final resting spot of striker 50 is at base 356, where striker 50 is fully engaged in latch notch 350 of catch 320. Should it be desired, a position sensor or switch can be placed at base 356 to provide an indication whether or not striker 50 is fully engaged. As striker 50 is being engaged and travelling along sloped edge 352 of catch 320, number five bow 20 is pulled down and snugged against an appearance surface of tonneau cover 30. Thus, catch mechanism 60 is capable of pulling down number five bow 20 to ensure a snug fit when latched. A further vertically movable extension of catch 320 or striker 50 may be provided to accentuate the pull down function. Such a vertical pull down extension is commonly used with strikers on trunk lid latches. As can be appreciated by referencing FIGS. 3 and 4, weather stripping 450 can be placed along the lower edge of number five bow 20 where it contacts tonneau cover 30 so as to provide a barrier to infiltration. As number five bow 20 is snugged against tonneau cover 30, weather stripping 450 is compressed.

Figure 6:
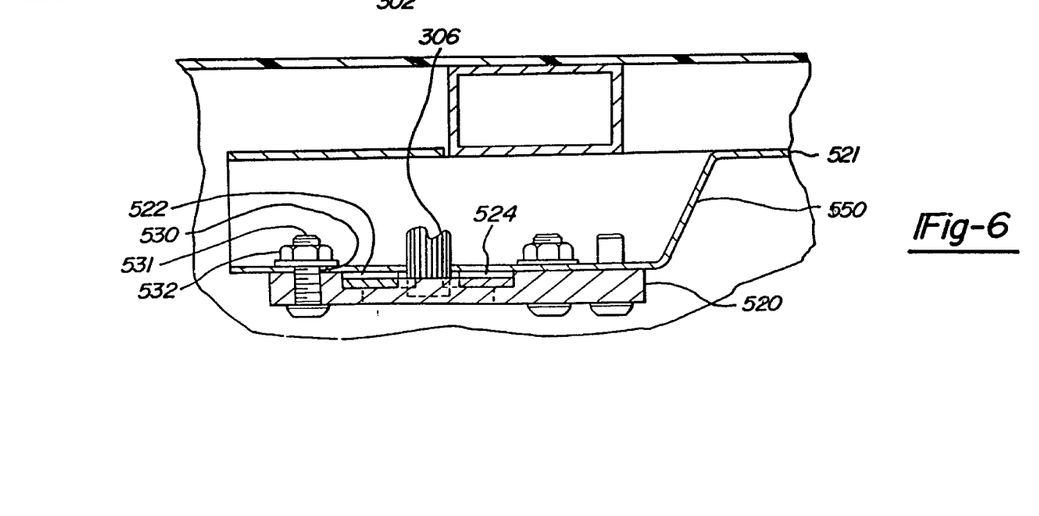
FIG. 6 is a sectional view, taken along line 6—6 of FIG. 2, showing the preferred embodiment of the rear latching apparatus of the present invention.

Referring again to FIG. 2, drive mechanism 200 will be described in greater detail. Pinion gear 306 of drive mechanism 200 is rotated by a 12 Volt D.C. electric gear motor 510, commercially available from any number of sources, such as Jideco or Nippondenso. Pinion gear 306 is affixed to an output shaft of motor 510. Racks 302 and 304, and motor 510 are held in place by a lower and an upper mounting bracket 520 and 521, respectively. As can be seen best by referring to FIG. 6, lower mounting bracket 520 has channels 522 and 524 which provide tracks for racks 302 and 304 to slide within. Both lower and upper mounting brackets 520 and 521 include mounting holes 530 into which bolts 531 are placed for engagement with nuts 532. Thus, motor 510 is secured to lower mounting bracket 520 and lower mounting bracket 520 is attached to upper mounting bracket 521. Racks 302 and 304 are sandwiched in place between mounting brackets 520 and 521 by bolts and nuts as well with the entire mounting bracket and drive mechanism assembly 200 (see FIG. 3) affixed to the underside of tonneau cover 30 by way of spot welds. As can be seen in FIG. 6, upper mounting bracket 521 has an S-shaped bend 550 to allow clearance of pinion gear 306 when drive mechanism 200 is welded to the car. Of course, it can be appreciated that the configuration of the mounting brackets can be modified to best suit any particular vehicle.

The latching mechanism of the present invention is able to both pull down the number five bow and secure it. This has the advantage of reducing the amount of intervention required of a vehicle occupant when trying to close the convertible roof. For example, when used in conjunction with an automated top stack mechanism, the occupant does not need to manually latch the number five bow. Instead, the latching mechanism of the present invention is able to "grab" the number five bow and pull it down to a secure position once the five bow is in the vicinity of its final resting position without requiring the occupant to manually push down on the number five bow to bring it into position for latching.

Also, because the latching mechanism of the present invention employs a dual rack and pinion with rigid connecting rods, a single drive pinion can be used to "pull" both of the latches closed and "push" both of the latches open. This reduces the complexity of the latching mechanism without sacrificing performance. It can be appreciated, however, that should concerns like packaging or weight become a problem, the drive mechanism can be modified to take the form of a dual rack and pinion with non rigid connections between the racks and catches. In such an embodiment, one rack translates to engage the left catch and disengage the right catch, while the other rack translates to engage the right catch and disengage the left catch. Or, a window shade mechanism could be employed whereby the drive mechanism causes a flexible cord or cable to be spooled and unspooled to translate the catches between the engaged and disengaged positions. However, regardless of the particular configuration of the drive mechanism, a single drive mechanism can still be used to move both catches, thereby still retaining the complexity reduction advantages of the presently preferred embodiment.

Figure 7:
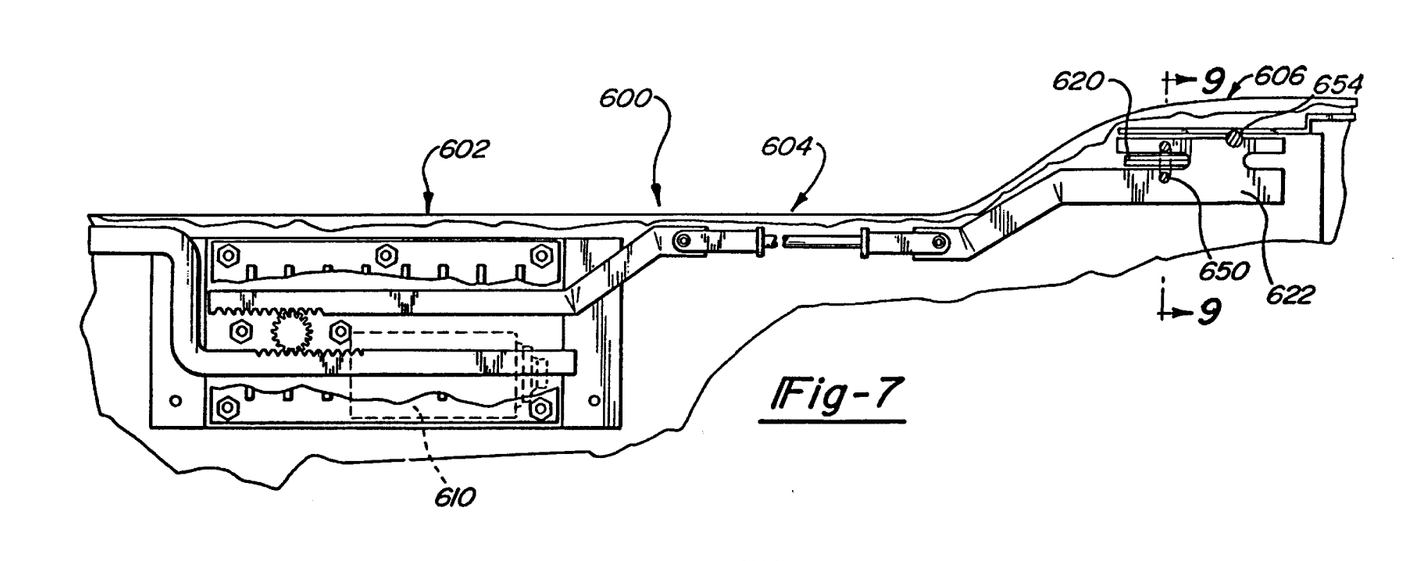
FIG. 7 is a fragmentary top elevational view showing a preferred embodiment of a forward latching apparatus of the present invention of FIG. 1.
Figure 8:
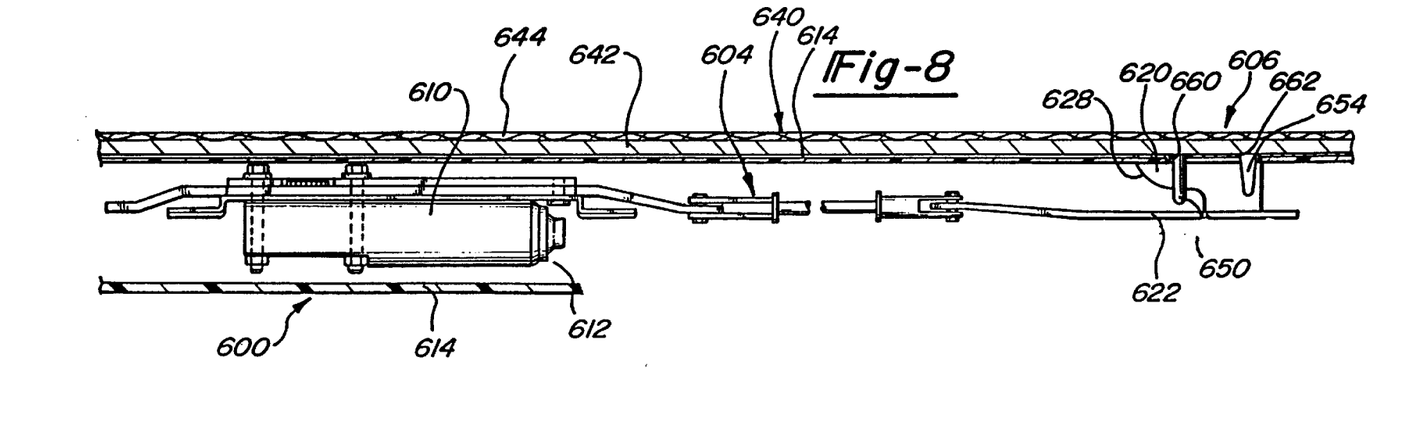
FIG. 8 is a fragmentary rear elevational view showing the preferred embodiment of the forward latching apparatus of the present invention of FIG. 7, illustrated in an engaged position.
Figures 9, 10:
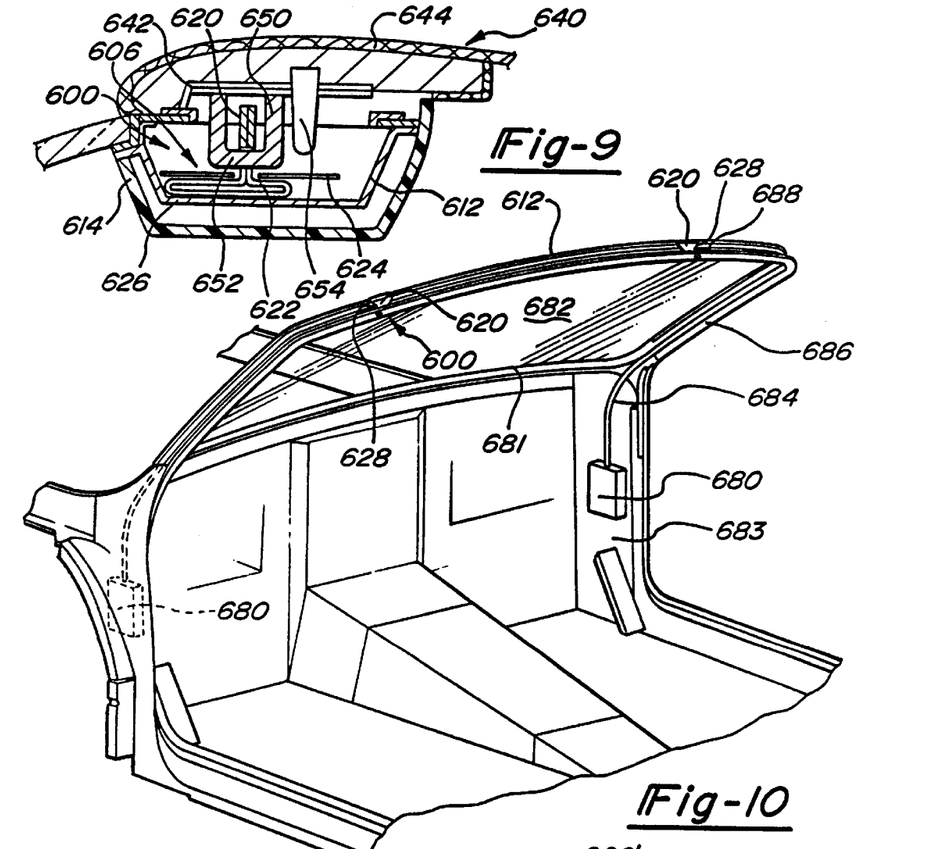
FIG. 9 is a sectional view, taken along line 9—9 of FIG. 7, showing the preferred embodiment of the forward latching apparatus of the present invention.
FIG. 10 is a perspective view showing an alternate embodiment of a forward latching apparatus of the present invention of FIG. 1.

A preferred embodiment of a forward latching apparatus 600 is shown in FIGS. 7 through 9. Forward latching apparatus 600 has a centrally located drive mechanism or actuator 602, a pair of connecting elements 604 and a pair of catch mechanisms 606. Since both connecting elements 604 and catch mechanisms 606 are substantially symmetrical about the centerline of the vehicle, only the right side (as viewed from behind the automotive vehicle) will be described hereinafter. Drive mechanism 602 consists of an electric motor 610 and a rack and pinion arrangement similar to that described above regarding rear latching apparatus 18 (see FIG. 5). Of course, a manually operated actuator such as a hand crank, an electromagnetic solenoid-type system or the like could be employed in place of electric motor 610 for any of the forward or rear latching apparatuses discussed within this application. Drive mechanism 602 is securely attached and protectively hidden within a front header assembly 612 which can be aesthetically covered by a garnish molding 614. Connecting element 604 is also substantially similar to that heretofore discussed with regard to rear latching apparatus 18 (see FIG. 5). Furthermore, the rack and pinion systems preferably described within any of the forward and rear latching apparatuses may be replaced by a variety of other known coupling elements such as a sprocket and chain system, a cable system or a rod system. Connecting elements 604 and catch mechanisms 606 are disposed within front header assembly 612.

Each catch mechanism 606 includes a substantially vertically oriented catch 620 and a substantially horizontally oriented carrier 622. Carrier 622 is designed to move in a linearly transverse or cross car manner between a bracket 624 and a lower surface 626 of front header assembly 612 to which it is attached. Catch 620 has a sloped edge 628 which defines an outwardly sloping notch.

In this presently preferred embodiment, a soft-top convertible roof assembly 640 has five roof bows, the forwardmost of which is known as a number one roof bow 642. A fabric covering 644 spans between the bows. A pair of latch loops or strikers 650 project from number one bow 642. Each striker 650 is substantially D-shaped with a somewhat horizontal member 652 running in a fore and aft manner. A pair of tapered centering pins 654 also project downward from number one bow 642 for engagement with holes in front header assembly 612.

Drive mechanism 602 and connecting elements 604 are actuable to translate catches 620 from an outboard unengaged position to a striker engaging position, closer to the vehicle centerline, as is shown in the currently referenced figures. Thus, when roof 640 is extended to its functional position covering a vehicle passenger compartment 656 (see FIG. 1), strikers 650 and centering pins 654 are extendable into their respective receiving holes 660 and 662. At that point, sloped edge 628 of each catch 620 can be moved to engage and pull down horizontal member 652 of each striker 650.

Alternately, one or both catches 620 can be reversed with sloped edges 628 projecting outboard away from centrally located drive mechanism 602. In this scenario, connecting elements 604 would consist of flexible cables or a drive shaft and gear arrangement wherein the inwardly pulling forces applied by drive mechanism 602 would be reversed by a pulley or geared coupling to outwardly pull catches 620 from a disengaged position to a catch loop engaging position outboard therefrom. A pair of rigid rods could also be used to "push" catches 620 outboard toward their striker engaging positions.

FIG. 10 discloses another alternate embodiment wherein catches 620 are oriented with sloped edges 628 facing in an outboard direction away from the vehicle centerline. An upper portion of front header assembly 612 is removed to show the orientation of catches 620. Unlike the prior alternate embodiment, this embodiment employs a pair of drive mechanisms 680 remotely located below a horizontal plane defined by a lower edge 681 of a windshield 682. These drive mechanisms 680 are preferably fractional horsepower DC electric motors which may be positioned along kick panels 683 of the vehicle. Of course, a variety of other remote locations may be provided and a single remotely located drive mechanism 680 may drive both catches 620. A coupling element 684 consists of a flexible cable which can be routed through the vehicle A pillars 686 for attachment to a carrier 688 affixed to each catch 620. Thus, remotely located drive mechanisms 680 can synchronously move catches 620 from an inwardly located disengaging position to an outwardly located striker engaging position. The present embodiment is desirable if extra packaging space is required along front header assembly 612 proximate with the vehicle centerline. Thus, packaging space is available for overhead console lamps, sunglass bins, compass readouts or the like.

Figures 11, 12, 13:
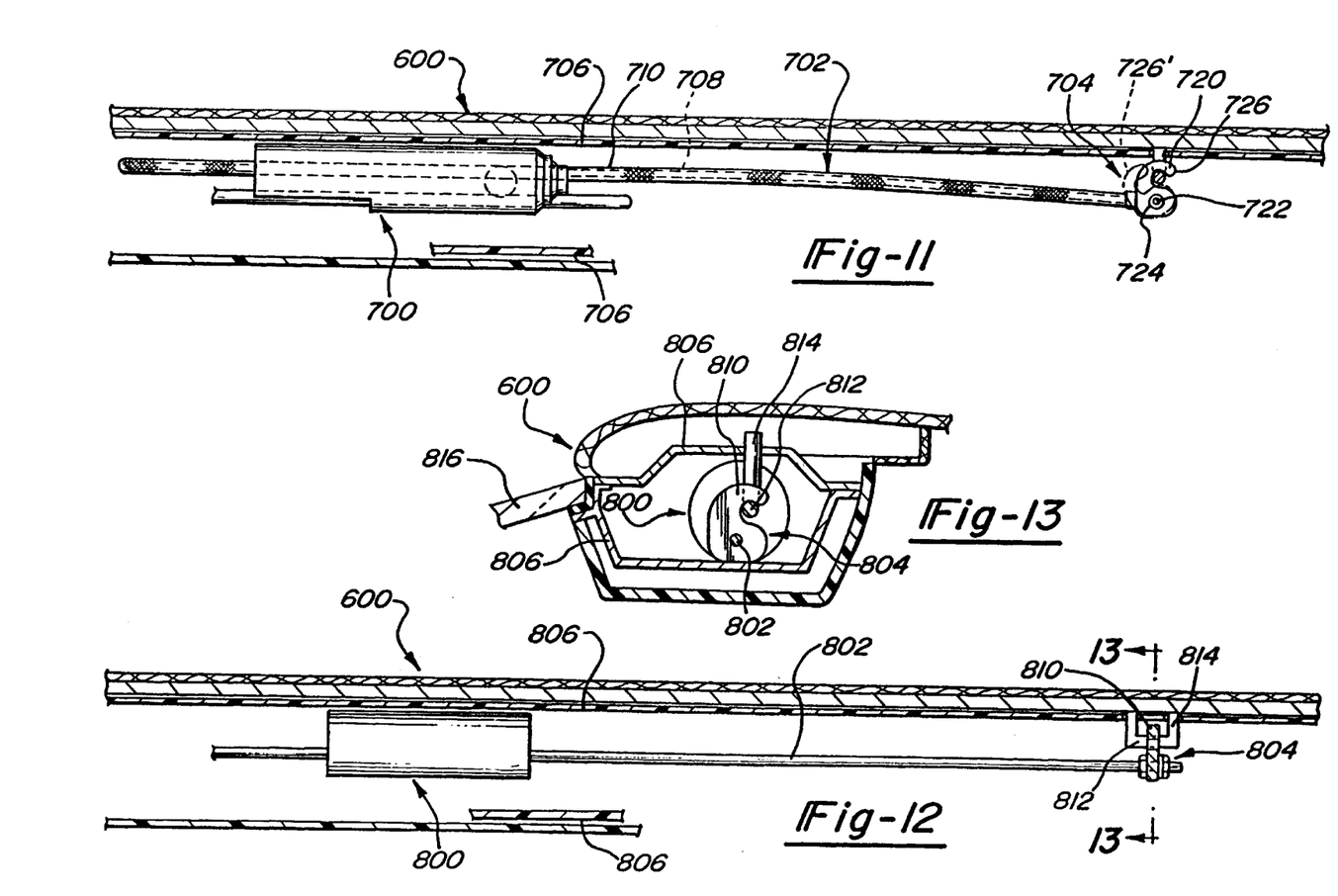
FIG. 11 is a fragmentary rear elevational view showing another alternate embodiment of a forward latching apparatus of the present invention of FIG. 1.
FIG. 12 is a fragmentary rear elevational view showing yet another alternate embodiment of a forward latching apparatus of the present invention of FIG. 1.
FIG. 13 is a sectional view, taken along line 13—13 of FIG. 12, showing the alternate embodiment of the forward latching apparatus of the present invention of FIG. 12.

FIG. 11 shows yet another alternate embodiment incorporating the teachings of the present invention. This embodiment comprises a centrally located drive mechanism 700, a pair of connecting elements 702 and a pair of catch mechanisms 704, all of which are located within a front header assembly 706. Drive mechanism 700 is preferably a fractional horsepower DC electric motor but may alternately be a manually operated crank or the like. Drive mechanism 700 serves to pull a flexible braided cable 708 within a sheath 710. Catch mechanism 704 includes a rotatable catch 720, a pivot pin 722 and a biasing spring 724. Pivot pin 722 is mounted to bracketry (not shown) affixed to front header assembly 706. In this embodiment, catch 720 is pivotable in a cross car or transverse manner. Biasing spring 724 serves to urge catch 720 to its catch loop engaging position 726. Catch 720 may alternately be pivoted to its disengaging position 726' by a pivotable coupling attached to connecting element 702 upon actuation of drive mechanism 700. A rod, chain, or drive shaft and gear system may be substituted in place of the presently described connecting element 702. Furthermore, a drive mechanism can be directly coupled to catch 720 at each outboard location. Of course, the remotely located drive mechanisms of the prior embodiment can be employed with a disengagably biased catch of the present exemplary embodiment. Also, catch 720 can be reversed to pivot inwardly toward the vehicle centerline to engage a striker.

Referring to FIGS. 12 and 13, another alternate embodiment of forward latching apparatus 600 provides a centrally located drive mechanism 800, a pair of connecting elements or rods 802 and a pair of fore and aft rotating catch mechanisms 804. Drive mechanism 800 is secured within a front header assembly 806. Rods 802 and catch mechanisms 804 are also rotatably disposed within front header assembly 806. Each catch mechanism 804 is defined by a pivotable catch 810 and bracketry (not shown) mounted to front header assembly 806. In this embodiment, a substantially horizontal member 812 of a pair of roof mounted strikers 814 are oriented in a substantially cross car manner. Accordingly, each catch 810 is pivotable fore and aft from a disengaging position, closest to a windshield 816, to a striker engaging position as is shown in FIG. 13. Catch 810 can be alternately reversed to rotate forward from a disengaging position to a striker engaging position closest to windshield 816. Drive mechanism 800 can also be directly coupled to catch mechanism 804 at each outboard location.

Figure 17:
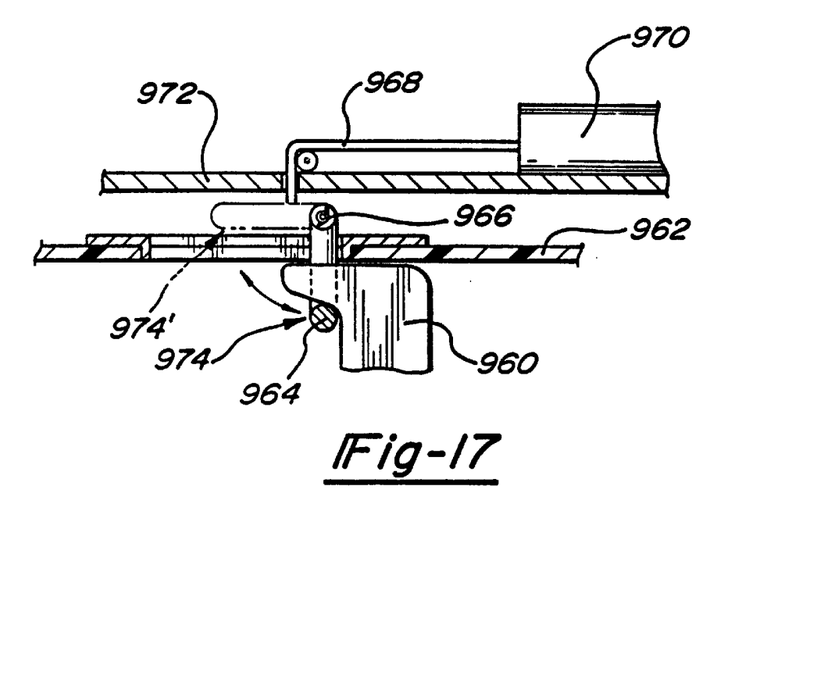
FIG. 17 is a rear elevational view showing a further alternate embodiment of a latching apparatus of the present invention of FIG. 1.

Yet another alternate embodiment apparatus of the present invention is shown in FIG. 17. In this embodiment, a stationary catch 960 is located proximate with a panel 962 such as a front header assembly or a tonneau cover. Operating in conjunction therewith is a striker 964 which is pivotable about a pivot pin 966 by a connecting element or cable 968 and a drive mechanism such as an electric motor 970. Striker 964, connecting element 968 and drive mechanism 970 are mounted to a forward or rear portion of a roof bow or panel 972 depending on the application. Of course, the striker and catch can be inverted on opposite vehicle panels. Therefore, striker 964 is pivotable from a catch engaging position 974 to a disengaging position 974'. It is intended that drive mechanism 970 is centrally located to actuate a pair of transversely disposed strikers 964.

Figure 18:
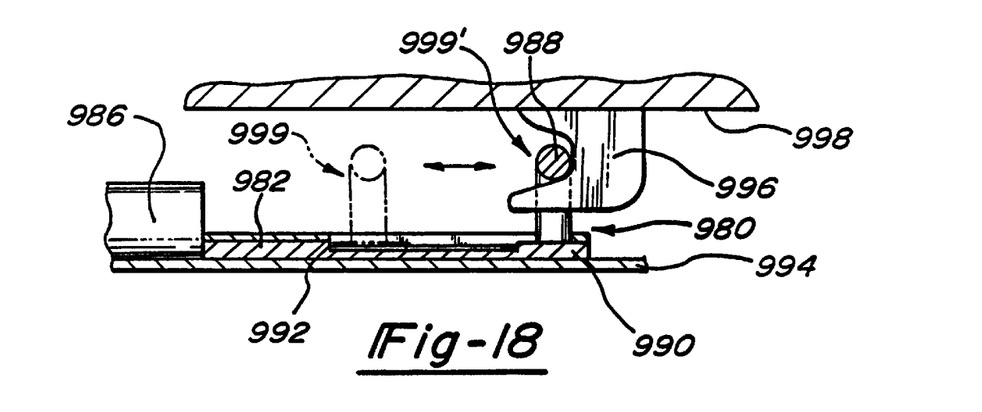
FIG. 18 is a rear elevational view showing yet another alternate embodiment of a latching apparatus of the present invention of FIG. 1.

Referring to FIG. 18, another embodiment latching apparatus of the present invention has a linearly movable striker assembly 980, a connecting element or rod 982 and a drive mechanism or electric motor 986. Striker assembly 980 is comprised of a striker 988 projecting from a carrier 990 which is slidably trapped between a bracket 992 and a panel 994 such as a front header assembly or a member attached to a tonneau cover. A catch 996 protrudes from a roof 998 and is engagable when striker 988 is moved from disengaging position 999 to catch engaging position 999' by drive mechanism 986 and connecting element 982. Catch 996 and striker assembly 980 may be alternatively inverted. It is intended that drive mechanism 986 is centrally located to actuate a pair of transversely disposed strikers 964.

A variety of alternate drive mechanisms and connecting elements may be employed for the apparatuses shown in FIGS. 17 and 18. For example, a hand crank or electromagnetic solenoid-type actuator may be used to pull, push or rotate chains, cables, rods, gears, belts or the like. These strikers or catches may also provide a vertically translating pull-down feature as is commonly used in trunk lid latches.

Figure 14:
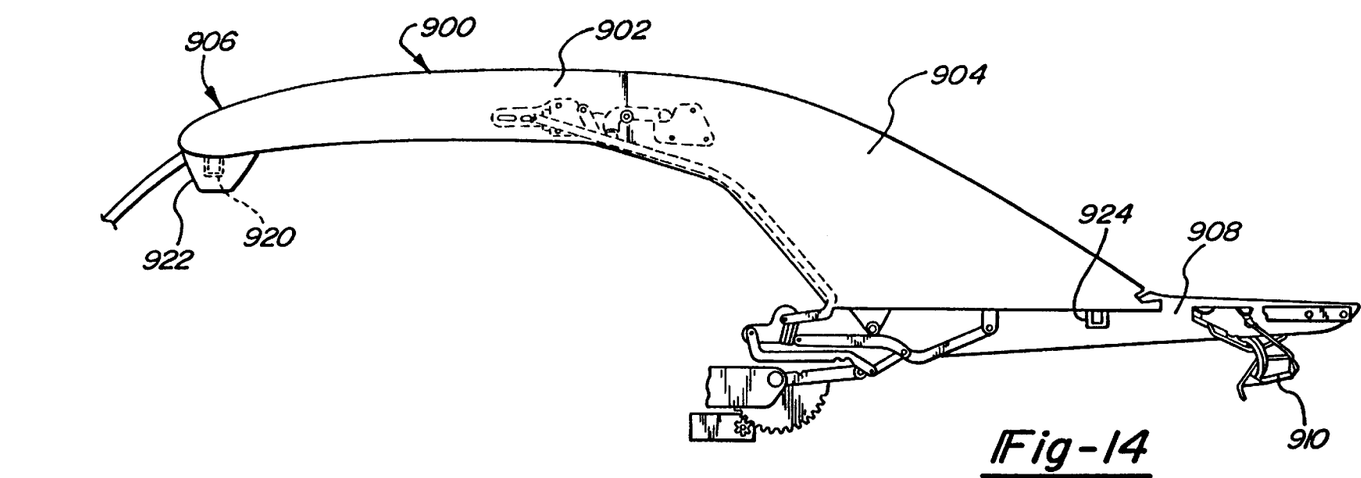
FIG. 14 is a side elevational view showing the preferred embodiments of the forward and rear latching apparatuses of the present invention of FIGS. 2 through 9 employed in a retractable hard-top roof system, illustrated in an extended functional position.
Figure 15:
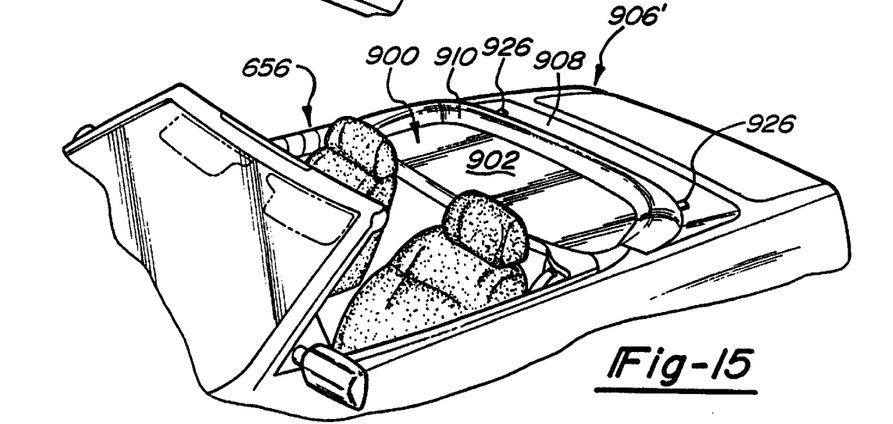
FIG. 15 is a perspective view showing the preferred embodiments of the forward and rear latching apparatuses of the present invention employed in the hard-top roof system of FIG. 14, illustrated in a retracted position.
Figure 16:
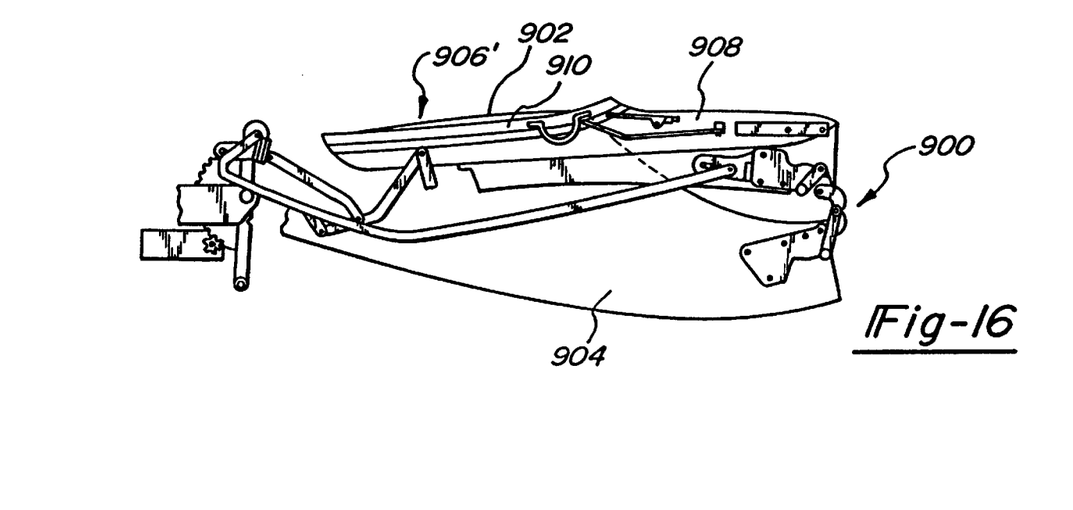
FIG. 16 is a side elevational view showing the preferred embodiments of the forward and rear latching apparatuses of the present invention employed in the hard-top roof system of FIGS. 14 and 15, illustrated in the retracted position.

Any of the catch and striker embodiments shown in FIGS. 1 through 13, 17 and 18 may alternately by employed in combination with a retractable hard-top roof system 900 as is illustrated in FIGS. 14 through 16. Hard-top roof system 900 includes a rigid front roof panel 902 and a rigid rear roof panel 904 which are coupled to one another and to the vehicle body for retractable movement. Hard-top roof system 900 is retractable from a fully extended functional position 906 (see FIG. 14) to a fully retracted and stowed position 906' (see FIGS. 15 and 16). In this embodiment, a pivotable tonneau cover 908 and a plurality of rotatable escutcheons 910 are provided. An exemplary forward pair of strikers 920 project downward from front roof panel 902 for engagement with any of the aforementioned embodiments of the present invention latching apparatuses disposed within a front header assembly 922. Furthermore, a rear pair of strikers 924 project from rear roof panel 904 through their respective receiving holes 926 within tonneau cover 908 for engagement with a latching apparatus of the present invention. Of course, vehicles having hard-top and soft-top roof combinations may employ any of the previously disclosed latching apparatuses of the present invention.

It will be appreciated that any of the forward latching apparatus embodiments described heretofore may be employed to secure the rear strikers projecting from the rearmost roof bow or panel. Thus, any of the aforementioned catch and striker mechanisms may be disposed proximate with the tonneau cover or the vehicle body adjacent to the tonneau cover. Accordingly, this aspect of the present invention is advantageous over traditional latches in that a substantially similar latching apparatus or components thereof may be employed for securing either or both the forward-most roof bow or panel and the rearmost roof bow or panel to the vehicle body. This symmetry of parts achieves lower tooling costs, less part numbers and reduced assembly and service complexity over conventional latching systems. Moreover, the present invention use of common parts for both the forward and rear latching functions even applies to many conventional type latches as long as they maintain substantially the same construction and function within the forward and rear roof securing applications.

While various embodiments of an apparatus for securing a convertible roof to an automotive vehicle have been disclosed, it will be appreciated that various modifications may be made without departing from the present invention. For example, the catch mechanisms may have a variety of differing shapes as long as they are capable of engaging a striker. Furthermore, the strikers discussed above may be eyelet-shaped, hook-shaped, T-shaped or L-shaped rather than the aforementioned preferred D-shape design. Also, any of the aforementioned embodiments may be employed in a roof system combining one or more hard and soft-top panels. Moreover, the function or mounting surface describing heretofore that is typically associated with a tonneau cover may be replaced by any body panel or the like serving a similar function therefore. Additionally, any of the latching apparatuses described herein may be used in combination with a variety of hard-top roof systems including roofs that are slidable, retractable into a trunk of the vehicle, or ones that are vertically storable. Various materials have been disclosed in an exemplary fashion, however, a variety of other materials may of course be employed. It is intended by the following claims to cover these and any other departures from the disclosed embodiments which fall within the true spirit of this invention.

The invention claimed is:

1. An apparatus for securing a convertible roof to a body of an automotive vehicle, said apparatus comprising:
    a first striker affixed to a rear portion of said roof and having a solid cross-sectional substantially horizontal member;
    a first catch mechanism disposed on said body of said automotive vehicle, said first catch mechanism being only pivotable about a single fixed and substantially horizontal pivot axis;
    a drive mechanism coupled with said first catch mechanism providing pivotal movement to said first catch mechanism for selectively and automatically engaging said substantially horizontal member of said first striker by said first catch mechanism, said first catch mechanism being substantially vertically pivotable for engaging a substantially horizontal member of said first striker;
    a second striker affixed to said roof, said second striker being transversely displaced from said first striker; and
    a second catch mechanism disposed on said body of said automotive vehicle and being transversely displaced from said first catch mechanism, said second catch mechanism movably engaging said second striker.

2. The apparatus of claim 1 wherein said body of said automotive vehicle includes:
    a movable tonneau cover; and
    said first catch mechanism being defined as a rear catch mechanism positioned proximate with said tonneau cover when said tonneau cover is in a lowered position.

3. The apparatus of claim 2 wherein:
    said first striker is a rear striker extending from a substantially rearmost portion of said roof and through a hole disposed within said tonneau cover for engagement by said rear catch mechanism.

4. The apparatus of claim 1 wherein said roof includes:
    a rigid front roof panel.

5. The apparatus of claim 4 wherein said roof further includes:
    a rigid rear roof panel;
    whereby said rigid roof panels are retractable to a retracted position and extendable to a functional position.

6. The apparatus of claim 5 wherein:
    said first striker is a rear striker projecting from said rear roof panel.

7. The apparatus of claim 4 wherein:
    said first striker is a forward striker projecting from said front roof panel.

8. The apparatus of claim 1 wherein said roof further includes:
    a plurality of roof bows supporting a fabric covering.

9. The apparatus of claim 8 wherein:
    said first striker is a rear striker projecting from a rearmost of said plurality of roof bows.

10. The apparatus of claim 1 further comprising:
    a third striker displaced near an opposite fore-aft portion of said roof from said first striker; and
    a third catch mechanism displaced near an opposite fore-aft portion of said roof from said first catch mechanism, said third catch mechanism engagable with said third striker.

11. The apparatus of claim 10 wherein:
    said first and second catch mechanisms have a substantially identical configuration.

12. The apparatus of claim 1 wherein:
    said first catch mechanism is pivotable in a substantially transverse manner.

13. The apparatus of claim 1 wherein said drive mechanism includes an electromagnetic device being mechanically coupled to at least one of said catches, said electromagnetic device causes said at least one of said catches to move without hydraulic assistance.

14. An apparatus for securing a convertible roof to a body of an automotive vehicle, said convertible roof having at least one retractable hard-top panel, said apparatus comprising:
    a hook-like first striker mounted to said hard-top panel of said roof, said hard-top panel being movable between a raised position covering a portion of a passenger compartment and a lowered and at least partially hidden retracted position;
    a first catch mechanism pivotably mounted to said body of said automotive vehicle for selectively engaging and disengaging said first striker thereby securing said roof to said body, said first striker entering an access hole in said body for being engaged by said first catch mechanism;
    a second catch mechanism pivotably mounted to a front header of said automotive vehicle, said second catch mechanism being entirely disposed in said front header when in an engaging position;
    an electromagnetic device causing said second catch mechanism to pivot from a disengaging position to an engaging position;

said first striker depending from a rear portion of said roof;

a second striker depending from a front portion of said roof; and a third striker depending from another rear portion of said roof transversely offset from said first striker.

15. The apparatus of claim 14 further comprising a second hard-top panel hingeably coupled to first panel, said panels foldably retracting in a clamshelling manner.

16. The apparatus of claim 14 wherein said catch mechanisms pivot in at least one plane oriented in a transverse and vertical direction.

17. The apparatus of claim 16 wherein each of said strikers includes a substantially horizontal and solid member spanning between a pair of vertical members as a single piece.

18. An apparatus for securing a convertible roof to a body of an automotive vehicle, said apparatus comprising:

a first striker affixed to a rear portion of said roof;

a first catch mechanism disposed on said body of said automotive vehicle, said first catch mechanism having a hook-like shape;

a drive mechanism coupled with said first catch mechanism pivoting said first catch mechanism for selectively engaging said first striker by said first catch mechanism;

a second striker affixed to said rear portion of said roof, said second striker being transversely displaced from said first striker; and a second catch mechanism disposed on said body of said automotive vehicle and being transversely displaced from said first catch mechanism, said second catch mechanism selectively engaging said second striker.

19. The apparatus of claim 18 further comprising a cable connecting said first catch mechanism to said drive mechanism, said drive mechanism including an electromagnetic device.

20. The apparatus of claim 19 further comprising a second cable connecting said second catch mechanism to said electromagnetic device.

21. The apparatus of claim 18 wherein both of said catch mechanisms are driven by said drive mechanism located substantially between said catch mechanisms.

22. The apparatus of claim 18 wherein each of said strikers include a substantially horizontal member spanning between a pair of substantially vertical members as a single piece.

* * * * *

UNITED STATES PATENT AND TRADEMARK OFFICE
CERTIFICATE OF CORRECTION

PATENT NO. : 5,772,275
DATED : June 30, 1998
INVENTOR(S) : Stephen P. Tokarz

It is certified that error appears in the above-indentified patent and that said Letters Patent is hereby corrected as shown below:

On the Title Page, under U.S. Patent Documents, reference Re.24,375, "4/1957" should be -- 10/1957 --.

Column 8, line 42, "by" should be -- be --.

Column 9, line 31, "storable" should be -- stowable --.

Column 9, line 41, delete "solid cross-sectional".

Column 9, line 42, after "member" insert -- with a solid cross-section --.

Column 10, line 57, after "securing" insert -- and unsecuring --.

Signed and Sealed this

Ninth Day of March, 1999

Attest:

Q. TODD DICKINSON

*Attesting Officer*     *Acting Commissioner of Patents and Trademarks*